United States Patent [19]

Berenberg et al.

[11] 4,328,448
[45] May 4, 1982

[54] METHOD FOR PROGRAMMABLY CONTROLLING THE SEQUENCE OF EXECUTION OF DATA BLOCKS IN A PROGRAM

[75] Inventors: John A. Berenberg; David M. Clabaugh, both of Cincinnati; Ralph C. Taylor, Jr., West Chester, all of Ohio

[73] Assignee: Cincinnati Milacron Inc., Cincinnati, Ohio

[21] Appl. No.: 183,300

[22] Filed: Sep. 2, 1980

[51] Int. Cl.³ ............................................. G05B 13/00
[52] U.S. Cl. .................................... 318/561; 318/570; 364/474
[58] Field of Search ............... 318/561, 568, 569, 570, 318/574, 632, 567; 364/474, 475

[56] References Cited
U.S. PATENT DOCUMENTS

T977,007  12/1978  Selander ............................. 364/474
3,306,442   2/1967  Devol ................................. 209/121

Primary Examiner—J. V. Truhe
Assistant Examiner—Eugene S. Indyk
Attorney, Agent, or Firm—C. Richard Eby

[57] ABSTRACT

A method is disclosed for detecting the presence of a workpiece characteristic and controlling the sequence of execution of operational steps in a machining program. First instructions in a machining program cause a sensing element to execute a scanning cycle to detect workpiece characteristics. Second instructions in the machining program test for the presence of the workpiece characteristics to determine the next operational step to be executed. The next operational step may be sequentially located in the program or may be identified by third instructions which define a nonsequential program location. Jump instructions are also provided to execute an unconditional jump to operational steps defined by a jump location instruction in the program.

12 Claims, 6 Drawing Figures

METHOD FOR PROGRAMMABLY CONTROLLING THE SEQUENCE OF EXECUTION OF DATA BLOCKS IN A PROGRAM

BACKGROUND OF THE INVENTION

The invention relates generally to the area of numerically controlled machines, specifically, the invention provides a method for utilizing a sensing element on a machine to detect a workpiece characteristic and modify the execution of operational steps in a machining program.

In utilizing the earliest numerical controls, a part programmer using a drawing of the finished part was required to program every machining motion sequentially thereby creating a machining program having a series of operational steps. A number of programming aids were subsequently developed. The most important was the development of part programming languages which allowed the programmer to describe the part in primarily geometric terms, and a programmed computer converted the programmers description into a machining program which could be directly utilized by a numerical control. However, the execution of the machining program still was basically sequential in nature. Numerical control manufacturers have provided other programming aids in the form of modal commands. These allow the programmer to define the parameters of an elementary machining process, and the numerical control creates the sequences of machine motions required to execute the cycle. Again, the operational steps of the program are effected sequentially. There is one numerical control option which can alter the strict sequential nature of the program execution—block delete. In this case, a part programmer precedes an operational step with a block delete code; and a block delete switch under control of the machine operator can be turned on or off to selectively execute the coded operational step. However, except for this minor variation, the overall sequential nature of the machining program remains.

Historically, there was no need or reason to deviate from the basic sequential operation. More recent developments in the area of workpiece sensors can now provide workpiece data that was heretofore unavailable during the machining process. Workpiece sensors can now determine if a part exists, its exact location relative to the cutting tool, what type of part it is within a family of parts, if it is dimensionally within tolerance and the presence of other workpiece characteristics. Consequently, the need exists to modify the traditional sequential operation of a machining program to accommodate and utilize the additional data that can be collected during the machining process.

For example, a machining program may be written which describes every machining operation of the most complex member in a family of parts. If a less complex member of the part family is loaded on the machine, the workpiece sensor can be used to identify that particular part and efficiently machine the part by skipping all unnecessary operational steps, i.e. the machining program can be executed in a logical, but non-sequential fashion.

In another example, if a workpiece must contain a particular characteristic, e.g. a core hole, to enable the execution of other operational steps, the workpiece sensor can determine whether the hole exists, and, if necessary, cause the hole to be drilled, thereby executing a nonsequential series of operational steps in the machining program.

In another example, if the workpiece sensor detects that the workpiece is absent or is dimensionally out of tolerance, the remaining machining program can be skipped.

There are many applications where it is desirable to improve the efficiency of the machining process by modifying the executional sequence of operational steps in the machining process. The object of the claimed invention is to allow the part programmer to use a programmably controlled sensing element and execute operational steps in the machining program on a conditional basis depending on sensed workpiece characteristics.

SUMMARY OF THE INVENTION

According to one embodiment of the invention, a method is claimed for detecting the presence of a workpiece characteristic and controlling the sequence of execution of operational steps in a machining program. The machining program is stored in a numerical control for a machine that controls the relative motion between a workpiece and a toolholder which selectively contains a cutting tool or workpiece sensing element. The method comprises the first step of storing with the machining program instructions that, first, define a scanning cycle for detecting a workpiece characteristic, second, define a test cycle for selecting a subsequent operational step based on the presence of the workpiece characteristic, and third, define the location of a nonsequential operational step. During the execution of the machining program, the method executes the scanning cycle, tests for the presence or absence of the workpiece characteristic and selects the next operational step to be executed in response to the test of the workpiece characteristic.

DESCRIPTION OF THE PREFERRED EMBODIMENT

Figure 1:
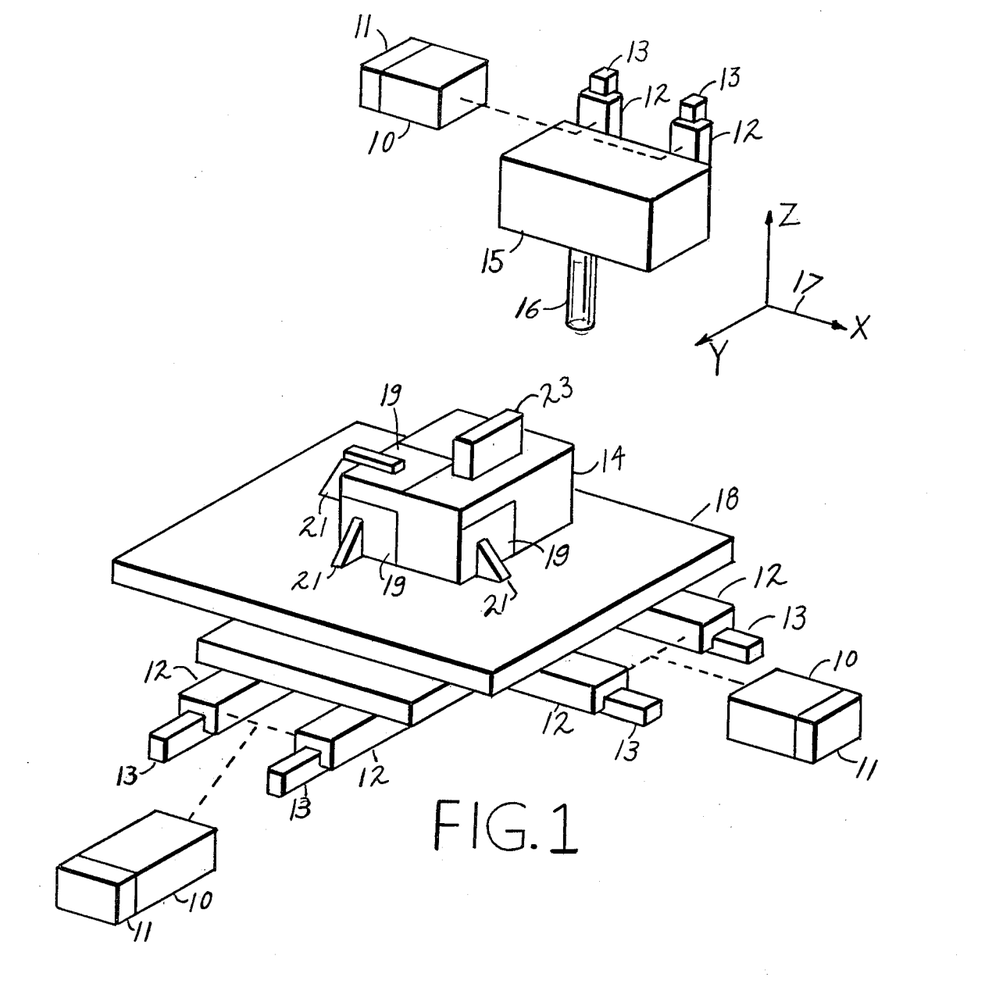
FIG. 1 is an illustration of the basic elements of a machine to which the invention may be applied.

FIG. 1 illustrates in schematic form one type of machine to which the claimed invention may be applied. Motors 10 and associated position transducers 11 are mechanically connected to slides 12 for moving the slides 12 along the stationary ways 13 and generating signals representing the relative positions of the slides 12. The slides 12 and stationary ways 13 are arranged parallel to the mutually perpendicular axes of the triordinate coordinate system 17. A machine coordinate system is established by virtue of the mechanical connections of the motors 10 and position transducers 11 with the slides 12.

The workpiece 14 is carried by the table 18 which is in turn attached to those of the slides 12 which are parallel to the X and Y axes of the coordinates 17. A tool holder 15 is affixed to the one of the slides 12 which is parallel to the Z axis of the coordinates 17. A sensing element 16 is associated with tool holder 15. Relative motion of the sensing element 16 with respect to the workpiece 14 is accomplished by driving the motors 10. The workpiece 14 is held in place on table 18 by fixturing clamps 21 located on locating reference surfaces 19. Provided that the illustrated workpiece 14 is properly aligned on table 18, the locating reference surfaces 19 will define planes parallel to the planes defined by the coordinate axes 17. The workpiece may include a feature or characteristic such as a hole 23, the position of which, with respect to the locating reference surfaces 19, varies from workpiece to workpiece as a result of manufacturing variables. Further, the precise position of the locating reference surfaces 19 with respect to the machine coordinate system may vary from workpiece to workpiece because of changes in or movement of the fixturing clamps 21.

Figure 2:
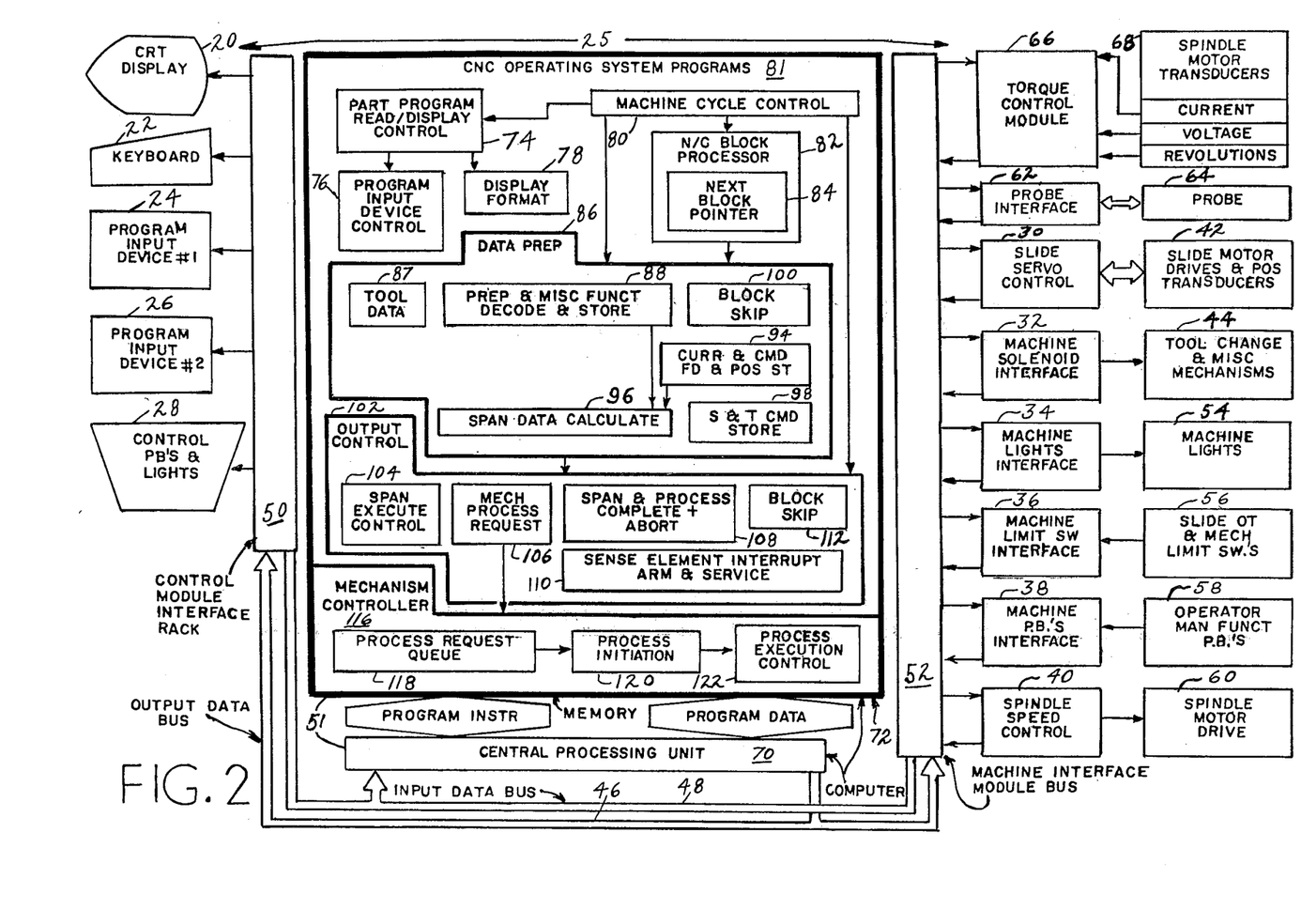
FIG. 2 is a general block diagram illustrating a computer numerical control for implementing the invention.

All motions of the slides 12 are controlled by the control 25 illustrated in FIG. 2 by signals generated and exchanged by the slide motor drives and position transducers 42. The invention herein describes a method for programmably detecting the presence of workpiece characteristics such as the hole 23 and then controlling the selection of subsequent operational steps in the machining program.

FIG. 2 is a general block diagram illustrating the architecture of a computer numerical control 25 in which the invention may be embodied. While the particular components depicted in this figure are those used in the computer numerical control manufactured by Cincinnati Milacron Inc., the invention may be implemented on any computer numerical control including equivalent components. Consequently, architectural details should not be construed as limitations on the methods claimed in this invention.

The primary communicative link between the operator and the control is the set of control console devices including the CRT display 20, the keyboard 22, the program input devices 24 and 26 and the control push buttons and lights 28. These devices are in turn coupled to the computer 51 through the control module interface rack 50. All information exchanged between these devices and the computer is carried over the input data bus 48 and the output data bus 46. These buses consist of eight parallel signal lines. Communication between the machine and control by which means the control monitors machine conditions and commands machine operation is accomplished through the set of machine interfaces including the slide servocontrol 30, the machine solenoid interface 32, the machine lights interface 34, the machine limit switch interface 36, the machine push button interface 38 and the spindle speed control 40. These interfaces control the following respective machine elements: the slide motor drives and position transducers 42, the tool change elements and other miscellaneous mechanisms 44, the machine lights 54, the machine slide overtravel and other mechanism limit switches 56, the operator function push buttons 58 and the spindle motor drive control 60. These machine devices are coupled through their respective interfaces to the computer through the machine interface module bus 52 and all information exchange between these devices and the computer is carried by the input data bus 48 and output data bus 46.

The surface sensing information is detected by a probe 64 which is connected to the machine interface bus 52 via a probe interface 62. In applicant's preferred embodiment, the probe 64 is a commercially available three-dimensional contacting probe which contains a limit switch contact that is activated upon probe deflection and deactivated when the probe is undeflected. The state of the probe limit switch is detected by the probe interface 62 which transmits this information via machine interface bus 52. As will be appreciated by those who are skilled in the art, the invention may be practiced with other surface detecting means, e.g. a capacitive sensor, a photoelectric sensor, an acoustic sensor, or other radiation sensing means.

As an alternative to the surface contacting probe 64, the invention provides a torque control module 66 which monitors spindle motor transducers 68 and generates a contact signal to produce a sensing element interface interrupt in response to the cutting torque being equal to or greater than a predetermined torque limit. The spindle motor transducers measure the current, voltage and angular velocity of the spindle motor. The details of the torque control module 66 are described in patent application Ser. No. 065,583 filed on Aug. 10, 1979 which is owned by the assignee of this application and is incorporated by reference herein. Any other commercially available cutting force sensing system that permits the programmer to define a detectable force limit could be used in place of module 66 and transducers 68.

The computer 51 consists basically of a memory 72 for storing program instructions and program data and a central processing unit 70 for interpreting program instructions and manipulating the program data. An operating system program 81 controls the sequence of executions of programs within the computer. Under supervision of the machine cycle control program 80, a part program read/display control program 74 controls the input of a machining program and other input information from the input devices 24,26 and the keyboard and push buttons 22 and 28. The input device control program 76 is a subroutine for controlling the operation input devices 24 and 26 which may be a tape reader or other input mechanism. The display format program 78 defines the character locations and other display operations which are related to the CRT display 20. The N/C block processor program 82 decodes the incoming data, performs parity and other error checks and converts the data into a format useful to the numerical control. Within the N/C block processor 82 is a next block pointer program 84 which keeps track of which block of data is being executed and locates the next block of data to be used.

The data preparation program 86 performs the general function of sorting the data processed by the N/C block processor 82 and storing the data in its respective storage locations. Under control of the data preparation program 86, the tool data program 87 will store identifying words for the active tools being used as well as coordinate compensation values for the length or diameter of these tools which may be entered manually by the operator or automatically by an automatic tool gauge. The computer numerical control considers the probe 64 to be a type of tool, and therefore the tool data program 87 will store tool number information identifying the probe as well as probe length and probe tip diameter data. The preparation and miscellaneous function decode and storage program 88 responds to a block of data and decodes all appropriate miscellaneous prespan and postspan functional information affecting spans required by the preparatory functions. This program responds to a number of new preparatory function G-codes and operation codes defined by this invention in order to initiate the scanning cycle and arithmetic functions required. Further, this program responds to input data for activating and balancing the torque control circuit as well as defining reference torque limits. The current and commanded feed rate and position store 94 maintains current and future feed rate and position data. Given the position and feed rate data and other information, the span data calculate program 96 determines the magnitude of a current span length and determines the axial displacements and feed rates to achieve the desired span. The spindle speed and tool command store 98 defines the spindle speeds and tools requested by the programmer during the span being executed.

The output control program 102 receives the data from the data preparation program 86 and controls the execution and transfer of that data to the machine elements. A span execute control program 104 controls the generation and distribution of command signals representing axial coordinate data to the various servomechanisms. The mechanism process request program 106 controls the execution of prespan and postspan machine functions. The span and process complete or abort program 108 follows the execution of a particular machining span by the machine, determines the successful execution of a particular machining span or its premature termination and controls the response thereto. The sense element interrupt arm and service program 110 controls the activation of the interrupt circuits of the interface 62, or the torque sensing module 66. If the surface sensing element interrupt is activated, the program indicates a surface has been detected by terminating motion and setting the appropriate condition signals. The block skip program 114 controls the N/C block processor in its selection of nonsequential blocks of data by operating in conjunction with the next block pointer 84.

The mechanism controller 116 responds to requests from the mechanism process request program 106 to activate the necessary machine elements to execute the requested machine process; and the process request queue 118 stores a number of requested processes; and the process initiation program 120 services to the queue and initiates the processes stored therein. The process execution control program 122 monitors the execution of the activated processes and determines when these processes have completed their activity.

Figure 3:
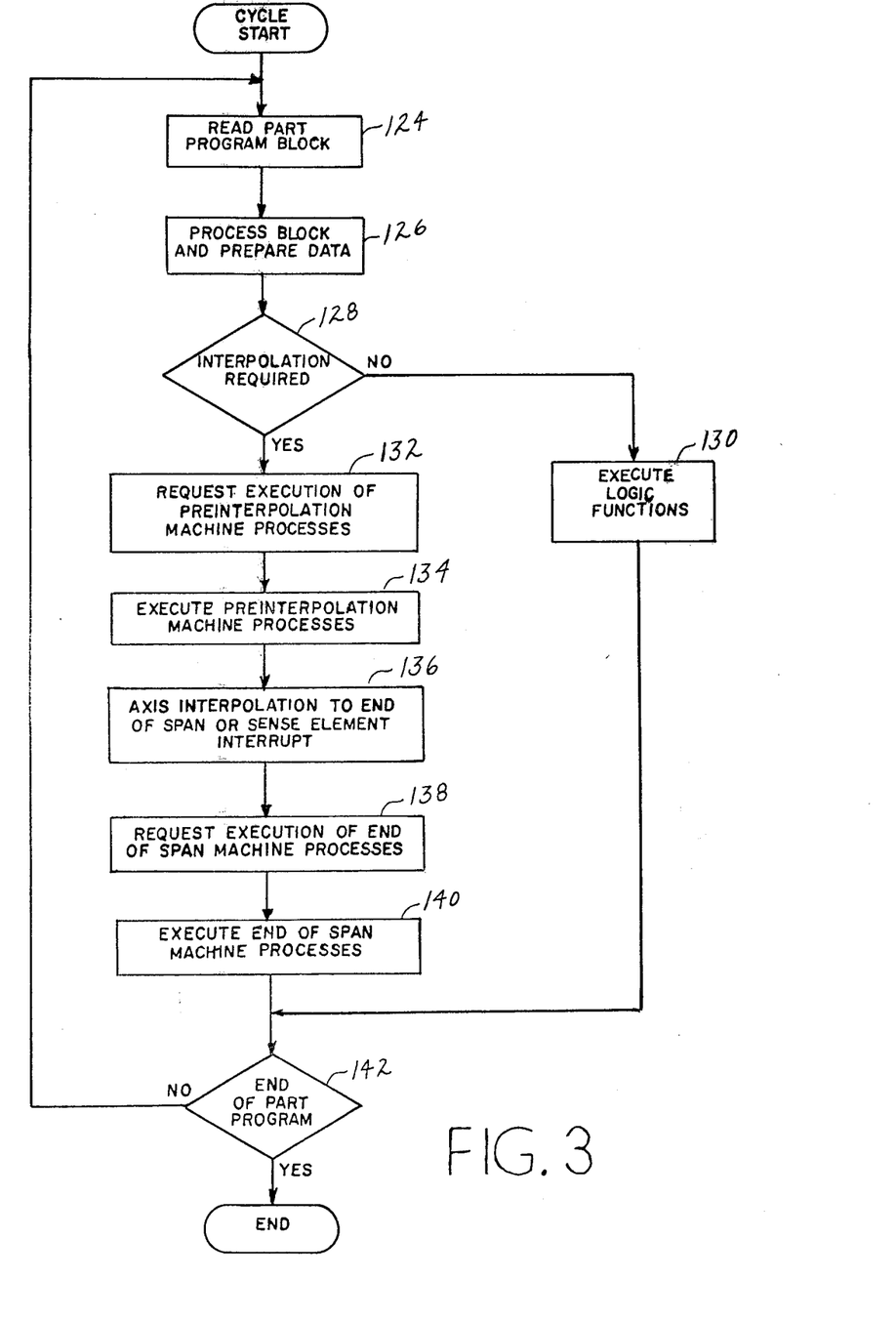
FIG. 3 is a flow chart illustrating the process steps for executing a general machine cycle of operation.

FIG. 3 is a flow chart of a general machine cycle and depicts the interaction of the components of the blocks of FIG. 2, as they act upon a block of information in a machining program. Assuming that the control is in a numerical control mode of operation as opposed to a manual or manual data input mode, the machine cycle is initiated when the operator depresses a cycle start push button. In reponse to the receipt of an input signal from the cycle start push button, the machine cycle control program 80 of FIG. 2 directs that a block of instructions and associated data be transferred from one of the program input devices 24 or 26. Process step 124 requires a transfer of the block of information into the control from an input device. Punch paper tape readers and flexible disc drives are typical of the types of program input devices commonly used. The current active input device is identified by the part program and read display control program 74 which in turn selects the appropriate input device operate program from the set of programs 76. Part program data is then transferred from the active input device to the buffer storage area associated with the N/C block processor program 82.

The process step 126 of FIG. 3 requires that the block of information be processed. The next block pointer 84 identifies the next block of data to be input which in this case will be the first block of the machining program. The N/C block processor programs 82 of FIG. 2 perform data error checks and convert the data from the code in which it is received from the input device to binary. The machine cycle control program 80 then directs that the data preparation program 86 separate the machine slide data from the machine mechanism data and calculate the incremental displacements of the machine slides from machining program data defining a starting position and a final position. The machine cycle control program 80 directs the output control program 102 to separate the axis and interpolation data from such mechanism operations as spindle speed, tool number and miscellaneous function commands. The output control program 102 then transfers span length and feed rate data to the servocontrol 30 via the machine interface bus 52.

Process step 128 decides whether interpolation is required. With the present invention, certain blocks of information may be programmed in which no slide motion occurs, but certain logical functions must be performed. If no interpolation is required, the process proceeds to step 130 which requires that the logical functions be executed. Referring back to FIG. 2, in blocks of information requiring logic functions, special preparatory codes will be decoded by the decode and store program 88; and the block skip program 100 will assemble the necessary information and data to execute the requested logical function. Thereafter the output control 102 will cause the block skip program 114 to execute the required logical functions. The span process complete block 108 will detect when these logical functions have been completed and move the process on to execute the next block of data or inhibit further processing as required by the logical functions.

Referring back to FIG. 3, if interpolation is required by process step 128 the process proceeds to step 132 which initiates the execution of those machine processes which must occur prior to moving the machine slides, e.g. turning on the spindle and coolant, activating the torque control module, establishing a necessary torque limit, etc. The output control program 102 of FIG. 2 initiates a machine process by activating the mechanism controller 116 which services the process queue 118. The effect of the activation is to inhibit the start of axis interpolation and permit the mechanism controller 116 to execute the requested prespan machine processes as defined in step 134 of FIG. 3.

After the requested processes are complete, the process execution control program 122 causes the mechanism controller 116 to generate a start of span N/C cycle release signal which allows the CNC operating system to permit axis interpolation to the end of span or surface interrupt as defined in process step 136 of FIG. 3. When executing a scanning cycle along one axis of motion, the scanning block of information may define an end point inside a workpiece surface. Consequently, when the sensing element detects the workpiece the active sensing element interface, i.e. torque control module 66 or probe interface 62, will generate an interrupt requiring service by the sense element interrupt arm and service program 110. This will cause an immediate inhibit of slide motion; and upon completion of the scanning cycle, an end of span signal will be generated. When the workpiece is not present, an end of span is achieved in the normal fashion. In either event, process step 138 requires that the output control program 102 initiate the execution of a return span as determined by the active preparatory function and controlled by the complete or abort program 108. Thereafter, the output control program executes any required postspan functions.

The particular processes to be executed after interpolation include such functions as stopping the spindle, turning off coolant and changing tools. The CNC operating system activates the mechanism controller 116 which proceeds to execute these processes as provided in process step 140 of FIG. 3. The CNC operating system is prohibited from continuing with the automatic machine cycle again until the mechanism controller 116 generates an end of span N/C cycle release signal. As provided in process step 142 of FIG. 3, if the machining program is not finished the final N/C cycle release will initiate the transfer of another block of information and the execution of another machine cycle. The process of FIG. 3 continues until the end of the part program.

The invention provides the part programmer with the capability of using a surface sensing element to detect the presence of workpiece characteristics. For example, assume there are two workpieces which are identical except that one workpiece has a core hole about which a bolt hole circle must be drilled for a cover plate. The other workpiece does not require the cover plate; therefore, the bolt hole circle should not be machined. Without the invention, the part programmer typically prepares two programs, one with and one without the bolt hole circle. Alternatively, one program may be used, but the machine operator must intervene and manually skip through the bolt hole circle machining steps.

With the invention, the part programmer prepares one program, in which immediately prior to the operational steps for machining the bolt hole circle, the programmer defines blocks of information to execute a scanning cycle to detect the presence of the core hole. Another block of information tests the results of the scanning cycle; and if the core hole exists, the program is executed in a continuous sequence to machine the bolt hole circle. If the core hole is not present, the program automatically skips to a nonsequential location after the the bolt hole circle machining instructions thereby skipping those machining operations.

A scanning cycle is initiated by first instructions defined by a special preparatory function or a G word. A two-digit G word may be arbitrarily chosen to accommodate programming standards. The scanning cycle is executed using a sensing element to detect a workpiece surface associated with a workpiece characteristic. The sensing element can be either a surface contacting probe 64 and its associated interface 62 or a cutting tool and the associated torque measuring circuitry including transducers 68 and interface module 66. When the cutting tool is used the programmer defines a predetermined torque limit equivalent to a superficial contact of the cutting tool with a workpiece surface. To distinguish between these two surface sensing elements a separate two-digit G word is utilized. As previously discussed, the tool change function is an end-of-span function. Therefore, in a block of tape immediately preceding the definition of a scanning cycle, the part programmer must define a tool change cycle to load either the surface contacting probe or the appropriate cutting tool into the spindle. To detect the presence of the core hole, the part programmer must first locate the machine spindle opposite the core opening thereby defining a starting position of a scanning cycle displacement. The scanning cycle will be executed by moving the sensing element towards the core hole opening along the Z axis of motion.

To achieve the scanning cycle, the programmer defines scanning instructions with the following block of information in the machining program:

Nnnn Gpp Zzzzzzzz

The N word defines the sequence number of the operational step in the machining program. The G instruction defines a workpiece characteristic scanning cycle utilizing the surface contact probe. The Z address defines the axis of motion in which the scanning cycle will occur, and the Z word defines a final position inside the surface of the workpiece, theoretically within the core hole opening. The scanning cycle is limited to occur in only one axis of motion at a time. However, it may occur in any of the three perpendicular linear axes; and therefore, instead of a Z being programmed, an X word or a Y word may be utilized. Further, other M, S and T words may optionally be included. This block of information will be read and decoded by the N/C block processor 82. The data preparation program 86 will decode the preparatory G function and prepare a scanning cycle to be executed in accordance with the process defined in FIG. 4.

Figure 4:
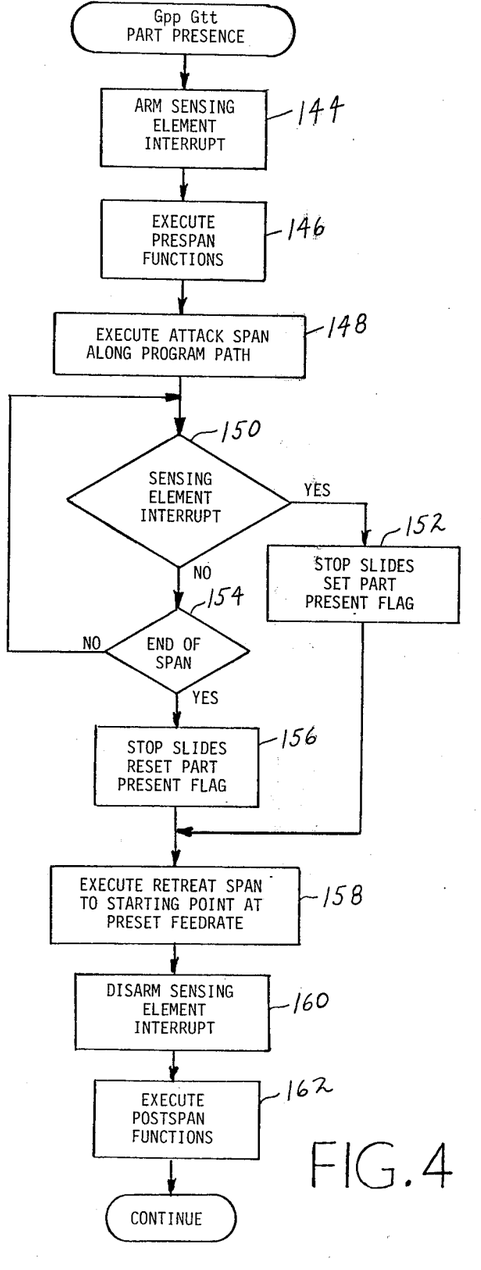
FIG. 4 is a flow chart illustrating the process steps for executing a scanning cycle to detect a workpiece characteristic.

Process step 144 of FIG. 4 is executed by the sense element interrupt arm and service program 110 of the output control program 102 to arm the interrupt of the sensing element interface, i.e. probe interface 62. Process step 146 directs the prespan functions to be executed. Process step 148 executes an attack span which has been prepared by the span data and calculate program 96 of the data preparation program 86. The attack span execution is controlled by the span execute control 104 within the output control section 102 which generates a first command signal to cause the sensing element to move at a first preset feed rate along the axis. Decision step 150 detects the occurrence of a sensing element interface interrupt. If the probe contacts a workpiece surface, it will cause an interrupt to occur which will be responded to by the sense element interrupt arm and service routine 110. This interrupt will cause the span abort routine 108 to immediately terminate the motion thus defining a first point of termination and set a part present flag representing a first state of a condition signal as defined in process step 152. If the sensing element interface interrupt does not occur, process block 154 checks for the end of span. When the span process complete routine 108 detects that the probe has moved to the final position defined by the Z word, an end of span signal is generated, thus defining a second point of termination. The sensing element motion is stopped, and process step 156 resets the part present flag representing a second state of the condition signal.

In either event, from either point of termination, the span data and calculate routine 96 of the data preparation function 86 generates a retreat span in response to the span complete program 108; and the output control section 102 through the span execute control program 104 causes the retreat span to be executed. The retreat span generates a second command signal to move the sensing element at a preset feed rate back along the Z axis to its starting point. When the probe is back to its starting position, process step 160 disarms the sensing element interface interrupt and process step 162 causes the mechanism controller 116 to execute any postspan funtions.

If the torque measuring circuit is to be used, the G word would be programmed as a Gtt, and an Fffff would be programmed. In this case, the attack span would be executed along the programmed axis at a feed rate defined by the F word. If a feed rate is programmed with a Gpp measuring cycle, it will be stored for the next nonmeasuring block of information.

At this point, the scanning cycle has provided the part programmer with data recording the existence of the core hole in the workpiece. If the probe contacted the workpiece, the part present flag is set indicating that no core hole exists. If the probe moved to the end of its programmed span, the part present flag is not set and therefore, the core hole does exist. In order to test the state of the part present flag, the programmer must define the following block of information in the machining program:

Nnnn (TST G6 T2222 F3333)

Again the N word defines the sequence number, and the parenthesis are used in accordance with recommended programming standards. The TST instruction defining a test function and the G6 instruction defining a test of the part present flag are second instructions defining a logical test function. The T and F words are third instructions defining locations in the part program to be searched depending on the outcome of the test. The T address is associated with a first state of the condition signal represented by the part present flag, and the T word defines a nonsequential first location in the machining program to be searched in response to the first state of the condition signal. The F address is associated with the second state of the condition signal, and the F word defines a second location in the machining program to be searched in response to the second state of the condition signal. In the preferred embodiment, the third instructions include separate blocks of information programmed in the machining program at the first and second locations. At the nonsequential first location in the machining program, the programmer inserts a Nnnn (LAB L2222) label block, and a Nnnn (LAB L3333) label block is programmed at the second location. Consequently, the T and F words will have a corresponding label address with an identical L word.

Figure 5:
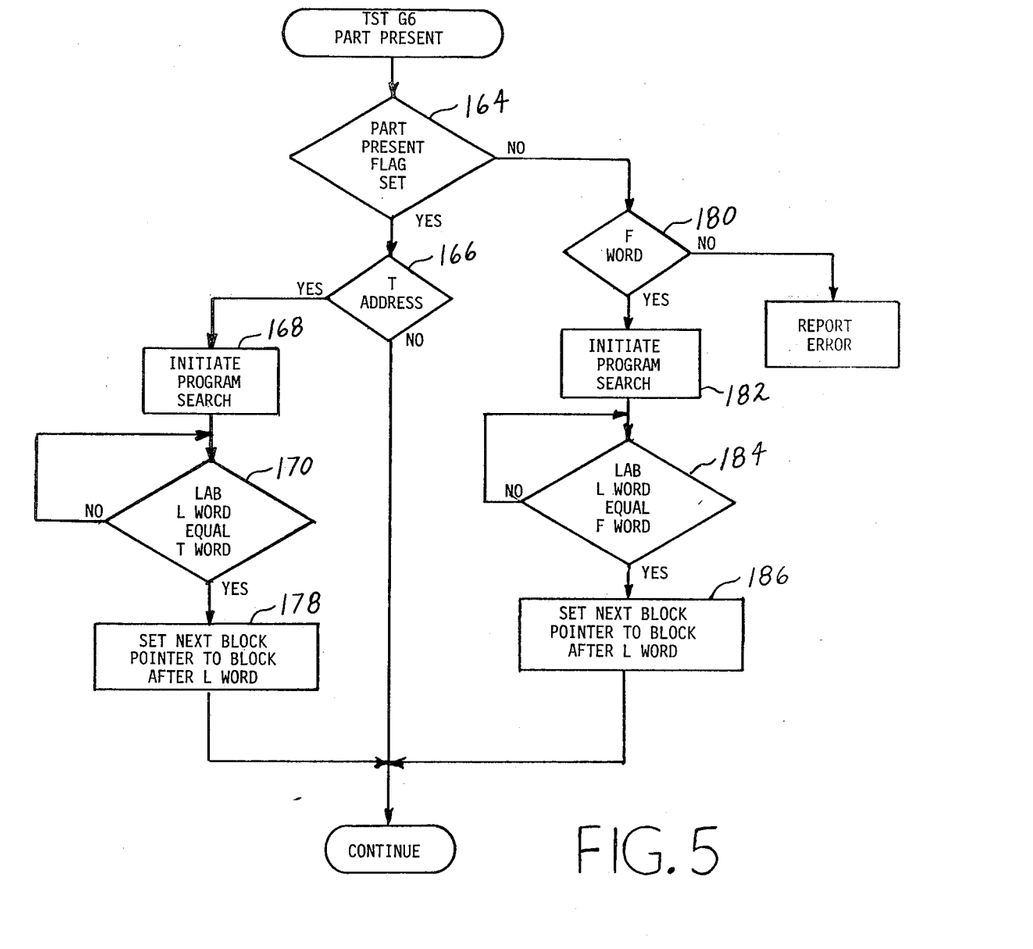
FIG. 5 is a flow chart illustrating the process steps for testing the workpiece characteristic.

The G6 testing process is illustrated in FIG. 5. Process step 164 determines whether or not the part present flag is set. Assuming no core hole exists, the flag will be set. Process step 166 determines the existence of a T address, and process step 168 initiates a program search to the label block having an L word corresponding to the programmed T word. In the current example, since no core hole exists, it is required that the succeeding machining steps defining the machining of the bolt hole circle be skipped; therefore, the part programmer immediately after the machining steps for the bolt hole circle would insert a label block of having a sequence number and an L address with an L word being identical to the T word.

The program search is initiated by the block skip program 114 of the output control section 102 which supplies the L word to the N/C block processor 82 and causes it to set the next block pointer 84 to the label block with an L word equal to the T word. Thereafter, the span complete program 108 generates an end of span signal to cause the machine cycle control program 80 to initiate transfer of the next block of the machining program. Since the next block pointer 84 has been set to the label block having the desired L word, the block processor 82 will not transfer block data of any intermediate blocks between the test block and the label block. Once the block processor detects the desired label block, it sets the next block pointer to the block immediately following the label block effectively terminating the search; and the machining program execution resumes with that block.

Returning to process step 164, if the part present flag was not set, it would indicate that the core hole was present. Process step 180 detects existence of the F address, and process step 182 initiates a program search to a label block having an L word equal to the F word. This operation is again executed by the block skip program 114 of the output control section 102 which controls the operation of the next block pointer routine 84 within the N/C block processor 82. In the present example, if a core hole does exist, the blocks of information causing the bolt hole circle to be machined must be executed. These blocks of information most probably would occur immediately after the test block of information; therefore, at that point, the programmer would insert a label block having an L address and an L word equal to the F word. Consequently, the program would be searched to the next block of information where a correspondence between the L word and F word would be detected; and process step 186 would set the next block pointer 84 to the start of the block of information immediately after the L block. This, of course, would initiate the machining of the bolt hole circle.

The preceding has described a capability which allows a part programmer to utilize a sensing element to detect the presence of a workpiece characteristic and use that information to perform conditional jumps within the part program. The invention provides a further capability. If the part program contains a number of alternative operational steps, the progress of the machining process may require the programmer to unconditionally skip certain of these operational steps. For example, if the workpiece on the machine is known to be one of a family of parts requiring different bolt hole patterns to be drilled, the part programmer creates one program containing operational steps to drill all the bolt hold patterns. In addition, the programmer adds a series of scanning and test part presence instructions to determine which hole patterns exist thereby defining the appropriate series of operational steps for machining the workpiece. Jump instructions are added to the end of each series of operational steps defining hole patterns to cause resumption of machining at the appropriate point in the program. This capability is provided by defining the following jump block of information in the machining program:

Nnnn (JMP L1111)

The JMP defines a jump instruction, and the L1111 defines a jump location instruction. In addition to this block of information, the programmer must insert a label block at the desired jump location. The label block contains an LAB operation code, an L address and an L word identical to the L word in the jump block. The label block must be located immediately prior to the block of information which is the target of the jump.

Figure 6:
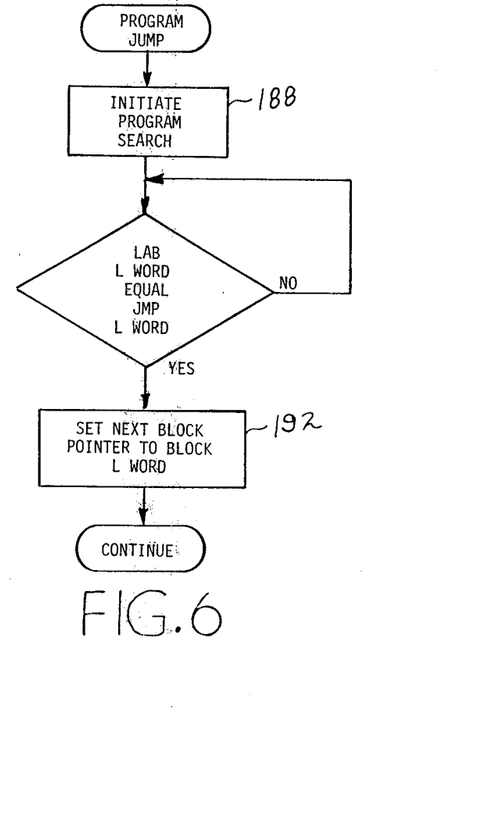
FIG. 6 is a flow chart illustrating the process steps for initiating a program jump.

Upon the N/C block processor 82 reading the JMP instruction, the block skip program 100 in the data preparation section 86 prepares a block of instructions which cause the block skip program 114 within the output control section 102 to initiate a program search as defined by the process of FIG. 6. Process step 188 requires that a program search be initiated. To accomplish this the block skip program 114 provides the next block pointer 84 within the N/C block processor 82 with the L word establishing the label block as the active next block. Thereafter, program blocks are transferred to the block processor 82 until a label block is encountered having an L word identical to the L word in the jump block. When this equivalence is found as indicated by process step 190, the next block pointer 84 is set to the block immediately following the label block in accordance with process step 192 and execution of the machining program resumes with that block. Thus the part programmer has the capability of executing both conditional jumps and unconditional jumps within the part program without any intervention on the part of the machine operator, thereby not interrupting the machining process. In the description of the scanning cycle, the test cycle and the program jump cycle, a number of programming codes have arbitrarily been chosen.

As will be appreciated by those who are skilled in the art, the actual codes used to execute these functions will depend on the system designer and the characteristics of a particular computer numerical control. Therefore, the particular codes utilized in the above description should not be considered to be a limitation on the claimed invention.

While the invention has been illustrated in some detail according to the preferred embodiments shown in the accompanying drawings, and while the preferred embodiments have been described in some detail, there is no intention to thus limit the invention to such detail. On the contrary, it is intended to cover all such modifications, alterations and equivalents falling within the spirit and scope of the appended claims.

What is claimed is:

1. A method for detecting the presence of a workpiece characteristic and controlling the execution sequence of operational steps in a machining program being stored in a control connected to a machine, said machine having machine slides moving along axes of motion in response to the machining program to effect relative motion between a workpiece and a tool holder having a cutting tool and a sensing element selectively associated therewith, the method comprising the steps of:
   (a) storing in association with the machining program
      (1) first instructions for defining a scanning cycle to cause the sensing element to detect the presence of a workpiece characteristic,
      (2) second instructions to test for the presence of the workpiece characteristic to determine the sequence of execution of subsequent operational steps in the machining program, and
      (3) third instructions defining a nonsequential location in the machining program associated with a particular operational step;
   (b) executing the scanning cycle in response to the first instruction to produce a condition signal having a first state in response to the sensing element detecting the workpiece characteristic and having a second state in response to a failure of the sensing element to detect the workpiece characteristic;
   (c) testing the state of the condition signal in response to the second instructions; and
   (d) controlling the sequence of execution of the operational steps in the machining program in response to the state of the condition signal and the third instructions.

2. The method of claim 1 wherein the step of controlling the sequence of execution of steps in the machining program further comprises the steps of:
   (a) continuing the sequential execution of operational steps in the machining program in response to one state of the condition signal;
   (b) searching the machining program for the nonsequential location of the particular operational steps defined by the third instructions in response to another state of the condition signal; and
   (c) continuing the execution of the particular operational step in the machining program.

3. The method of claim 1 wherein the tool holder has the sensing element associated therewith and the step of executing a scanning cycle further comprises the steps of:
   (a) storing in association with the first instructions data defining a displacement along an axis of motion from a starting position to a final position location inside a workpiece surface;
   (b) generating a first command signal to move the sensing element along the axis of motion towards the final position;
   (c) terminating motion of the sensing element in response to the sensing element detecting the workpiece characteristic;
   (d) setting the first state of the condition signal in response to the sensing element detecting the workpiece characteristic;
   (e) terminating motion of the sensing element in response to the sensing element reaching the final position;
   (f) setting the second state of the condition signal in response to the sensing element reaching the final position; and
   (g) generating a second command signal to move the sensing element from a point of termination back to the starting position along the axis of motion.

4. The method of claim 1 wherein the tool holder has the cutting tool associated therewith and the control includes a torque measuring circuit response to the cutting tool for generating a contact signal in response to the cutting torque imposed on the cutting tool being equal to a predetermined torque limit representing superficial contact of the cutting tool on the workpiece, and the step of executing a scanning cycle further comprises the steps of:
   (a) storing in association with the first instructions data defining a displacement along an axis of motion from a starting position to a final position located inside a workpiece surface;

(b) generating a first command signal to move the cutting tool along the axis of motion towards the final position;
(c) terminating motion of the cutting tool in response to contact signal;
(d) setting the first state of the condition signal in response to the cutting tool superficially contacting the workpiece;
(e) terminating motion of the cutting tool in response to the cutting tool reaching the final position;
(f) setting the second state of the condition signal in response to the cutting tool reaching the final position; and
(g) generating a second command signal to move the cutting tool from a point of termination back to the starting position along the axis of motion.

5. The method of claim 1 wherein the step of storing the third instructions further comprises the steps of:
(a) storing further third instructions identifying a nonsequential first location in the program in association with the first state of the condition signal;
(b) storing other third instructions identifying a second location in the program in association with the second state of the condition signal.

6. The method of claim 5 wherein the step of controlling the sequence of execution of the operational steps in the machining program further comprises the steps of:
(a) searching the machining program to the nonsequential first location in response to the condition signal being in the first state;
(b) continuing the sequential execution of operational steps in the machining program occurring at the nonsequential first location;
(c) searching the machining program to the second location in response to the condition signal being in the second state; and
(d) continuing the sequential execution of operational steps in the machining program occurring at the second location.

7. The method of claim 6 wherein prior to the step of searching the machining program to the nonsequential first location, the method further comprises the steps of:
(a) testing for the presence of the further third instructions; and
(b) continuing the sequential execution of the machining program in response to the absence of the further third instructions and the condition signal being in the first state.

8. The method of claim 7 wherein prior to the step of searching the machining program to the second location the method further comprises the steps of:
(a) testing for the presence of the other third instructions; and
(b) generating an error signal in response to the absence of the other third instructions and the condition signal being in the second state.

9. The method of claim 6 wherein the step of storing third instructions further comprises the steps of:
(a) storing a first address and a first location word in association with the third instructions;
(b) storing a second address and a first location word at the nonsequential first location in the program;
(c) storing a third address and a second location word in association with the third instructions; and
(d) storing the second address and the second location word at the nonsequential second location in the program.

10. The method of claim 9 wherein the method of claim 6 further comprise the steps of:
(a) initiating a search of the machining program;
(b) terminating the search of the machining program in response to the presence of the second address and the first location word;
(c) continuing the execution of operational steps in the machining program occurring after the first location word;
(d) initiating a search of the machining program;
(e) terminating the search in response to detecting the presence of the second address and the second location word; and
(f) continuing the execution of operational steps in the machining program occurring after the second location word.

11. The method of claim 1 wherein the method further comprises the step of storing in association with the machining program a jump instruction and a jump location instruction in the machining program.

12. The method of claim 11 wherein the method further comprises the steps of:
(a) detecting the jump instruction;
(b) searching the machining program to the jump location instruction in response to the jump instruction; and
(c) continuing the sequential execution of the operational steps in the machining program occurring after the jump location instruction.

* * * * *